United States Patent
Makismenka et al.

(10) Patent No.: US 7,523,141 B2
(45) Date of Patent: Apr. 21, 2009

(54) SYNCHRONIZATION OPERATIONS INVOLVING ENTITY IDENTIFIERS

(75) Inventors: Andrei Makismenka, Sammamish, WA (US); Ashish B. Shah, Sammamish, WA (US); Darshatkumar A. Shah, Redmond, WA (US); Lev Novik, Bellevue, WA (US); Neil Leonard Padgett, Redmond, WA (US); Jeremie Emilio Marcel Marie Sartor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 11/497,014

(22) Filed: Jul. 31, 2006

(65) Prior Publication Data

US 2008/0028000 A1    Jan. 31, 2008

(51) Int. Cl.
G06F 17/00    (2006.01)
(52) U.S. Cl. ...................................... 707/201; 707/202
(58) Field of Classification Search ................ 707/201, 707/202
See application file for complete search history.

(56) References Cited

U.S. PATENT DOCUMENTS

| | | | |
|---|---|---|---|
| 6,222,851 B1 | 4/2001 | Petry ........................... | 370/447 |
| 6,243,762 B1 | 6/2001 | Greene et al. ................ | 709/310 |
| 6,636,873 B1 * | 10/2003 | Carini et al. ................. | 707/201 |
| 6,745,387 B1 * | 6/2004 | Ng et al. ....................... | 718/101 |
| 6,993,522 B2 | 1/2006 | Chen et al. ...................... | 707/7 |
| 7,024,428 B1 * | 4/2006 | Huang et al. ................. | 707/201 |
| 7,350,034 B2 * | 3/2008 | Shen ........................... | 711/145 |
| 7,363,388 B2 * | 4/2008 | Huang et al. ................. | 709/248 |
| 2003/0182319 A1 | 9/2003 | Morrison ..................... | 707/200 |
| 2004/0049599 A1 | 3/2004 | Friend et al. ................. | 709/248 |
| 2004/0153576 A1 | 8/2004 | Hansmann et al. .......... | 709/248 |
| 2004/0220960 A1 | 11/2004 | Ojeil et al. ................... | 707/102 |
| 2005/0055382 A1 | 3/2005 | Ferrat et al. .................. | 707/201 |
| 2005/0091290 A1 | 4/2005 | Cammeron et al. .......... | 707/201 |
| 2005/0125621 A1 * | 6/2005 | Shah ........................... | 711/173 |

(Continued)

FOREIGN PATENT DOCUMENTS

WO    WO 99/49378 A2    9/1999
WO    WO 01/90933 A1    11/2001

OTHER PUBLICATIONS

"Customizing identity mapping and attribute handling," http://publib.boulder.ibm.com/infocenter/tivihelp/v2rl/index.jsp?topic=/com.ibm.itame.doc/am60_web_devref38.htm, downloaded from the Internet on Apr. 21, 2006, 3 pages.

(Continued)

Primary Examiner—Uyen T. Le
(74) Attorney, Agent, or Firm—Woodcock Washburn LLP

(57) ABSTRACT

Mechanisms are provided for identity mapping in synchronization systems. For example, entities can be mapped across various entity stores, such that an entity in one store can be identified with an entity in another store even if such entities are of different types. When entities are being synchronized across various entity stores, new or updated entity identities (and associated metadata) can be supplied to these stores as part of the same operation as that used for supplying changes during synchronization: entities can be merged and associated identity information and metadata can be changed accordingly; entities can be resurrected and new identity information can be created; metadata can be utilized even though entities are deleted, and so on.

20 Claims, 10 Drawing Sheets

U.S. PATENT DOCUMENTS

2005/0256907 A1  11/2005  Novik et al. .................. 707/200
2006/0020570 A1   1/2006  Wu ............................... 707/1
2007/0100834 A1*  5/2007  Landry et al. .................. 707/10

OTHER PUBLICATIONS

Terpstra, J.H., "Identity mapping (IDMAP), Part III. Advanced configuration," *Chapter 13*, http://www.samba.org/samba/docs/man/Samba-HOWTO-Collection/idmapper.html, downloaded from the Internet on Apr. 21, 2006, 14 pages.

Zondervan, Q., et al., "Data synchronization of portable mobile devices in a distributed database system," http://domino.research.ibm.com/cambridge/research.nsf/0/c71ebac11ec6e54f8525661600797829/$FILE/mobile.pdf, downloaded from the Internet on or about Apr. 19, 2006, 9 pages.

* cited by examiner

SYNCHRONIZATION OPERATIONS INVOLVING ENTITY IDENTIFIERS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004-2006, Microsoft Corp.

FIELD OF TECHNOLOGY

The present subject matter relates to the field of computing, and more particularly, to file and/or storage systems, although such systems correspond to merely an exemplary and non-limiting field of the presently disclosed subject matter.

BACKGROUND

Storage and management systems such as WinFS (Microsoft Windows® Future Storage or Microsoft Windows® File System), for example, allow different kinds of data to be identified by metadata and use this metadata to set up relationships among data, thereby giving a semantic structure to it. These relationships can then be used by a relational database to enable searching and dynamic aggregation of such data, allowing it to be presented in a variety of ways. In one setup, WinFS can include a relational database engine, derived from the Microsoft® SQL Server database platform, to facilitate such manipulation of data.

WinFS can maintain various entity stores. Such stores may have to be synchronized periodically. Broadly speaking, synchronization is the process of maintaining two or more data stores to be identical under some series of changes, both local and remote. This involves, at certain points in time, using synchronization operations, which move changes made on one store (since the last synchronization operation with another store) to the another store. These changes may conflict, so synchronization solutions often include conflict detection and resolution mechanisms.

This process of moving changes back and forth raises a requirement for an identity mapping mechanism. Given changes to entities from one store it may be necessary for synchronization to determine the corresponding entities in the other store to which those changes should be applied. Thus, one problem is the identification of corresponding entities across various entity stores. Another problem is the maintenance of entity identifications when numerous operations have occurred.

In short, mechanisms are needed, whether systems, methods, computer readable media, and so on, that addresses in an efficient manner these problems.

SUMMARY

To address these aforementioned problems, mechanisms are provided for identity mapping in synchronization systems. Entities can be mapped across various entity stores, such that an entity in one store can be identified with an entity in another store even if such entities are of different types. Moreover, when entities are being synchronized across various entity stores, new or updated entity identities, along with metadata, can be supplied to these stores as part of the same operation as that used for supplying changes during synchronization.

In one aspect of the presently disclosed subject matter, entities can be merged and associated identity information and metadata can be changed accordingly. In another aspect, entities can be resurrected and new identity information can be created. In yet another aspect, metadata can be utilized even though entities are deleted.

Thus, it should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Figure 1:
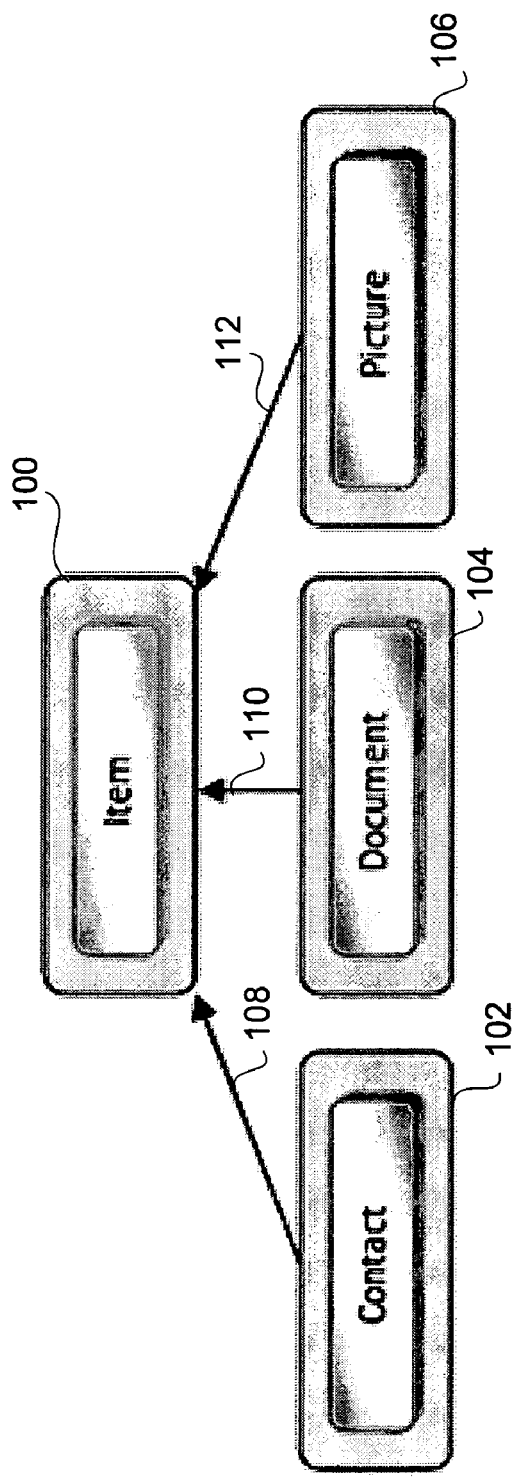
FIG. 1 illustrates a block diagram illustrating an exemplary type hierarchy.

Certain specific details are set forth in this description and accompanying figures to provide a thorough understanding of various aspects of the presently disclosed subject matter. However, certain well-known details often associated with computing and software technology are not set forth in this disclosure in order to avoid unnecessarily obscuring these various aspects. Further, those of ordinary skill in the relevant art will understand that they can practice other aspects of the presently disclosed subject matter without one or more of the details described below. Finally, while various methods are described with reference to steps and sequences in this description, the description as such is for providing a clear implementation of the aforementioned aspects, and the steps and sequences of steps should not be taken as required to practice this subject matter.

Overview of Microsoft Windows® File System (WinFS®)

Although the concepts, ideas and features described herein are described in an exemplary fashion with respect to how they are implemented in a file system called Microsoft Windows® Future Storage or Microsoft Windows® File System (WinFS) and the Microsoft Windows Vista® operating system, implementations in and applicability to other operating and file systems are contemplated, entirely possible and apparent to those skilled in the art based on the exemplary descriptions provided herein. Provided in this section is an overview of WinFS, drawn largely from sources such as http://www.msdn.com and other derivative sources thereof such as http://www.wikipedia.org, which includes description of the data storage, data model, type system, relationships, rules, access control, data retrieval, search and data sharing aspects of WinFS.

WinFS is a data storage and management system based on relational databases, developed by Microsoft Corp. (headquartered in Redmond, Wash.) for use as an advanced storage subsystem for the Microsoft Windows® operating system. Implemented on top of the NT File System (NTFS), one of the file systems for the Microsoft Windows NT® operating system, WinFS is a centralized data store for the Microsoft Windows® platform.

In WinFS, artificial organization using names and location is done away with, and a more natural organization is created than in hierarchical or desktop search systems—namely, one using rich properties to describe the data in files and the relation of that data with other data. By creating a unified datastore, WinFS promotes sharing and reuse of data between different applications. One advantage over any prior art is that any application, or even the file browser, can understand files created by any application. Addition of rich properties gives further meaning to the data, such as "which persons appear in which pictures," and "the person an e-mail was addressed to." But, instead of viewing the pictures and e-mails and files, WinFS recognizes picture, and e-mail to be specific types of data, which are related to person using the relation "of some person." So, by following the relation, a picture can be used to aggregate e-mails from all the persons in the picture and, conversely, an e-mail can aggregate all pictures in which the addressee appears in. WinFS extends this to understand any arbitrary types of data and the relations that hold them together. The types and relations have to be specified by the application that stores the data, or the user, and WinFS organizes the data accordingly.

WinFS stores data in virtual locations called stores. A WinFS store is a common repository where every application will store their data, along with its metadata, relationships and information on how to interpret the data. In this way, WinFS does away with the folder hierarchy, and allows searching across the entire repository of data.

WinFS store can actually be a relational store, where applications can store their structured as well as unstructured data. Based on the metadata, type of data, and also the relationships of the data with other data as can be specified by the application or the user, WinFS will assign a relational structure to the data. By using the relationships, WinFS can aggregate related data. WinFS provides a unified storage but stops short of defining the format that is to be stored in the data stores. Instead, it supports data to be written in application specific formats. But applications have to provide a schema that defines how the data should be interpreted. For example, a schema could be added to allow WinFS to understand how to read and thus be able to search and analyze, say, a contact. By using the schema, any application can read data from any other application, and also allows different applications to write in each other's format by sharing the schema.

Multiple WinFS stores can be created on a single machine. This allows different classes of data to be kept segregated. For example, official documents and personal documents can be kept in different stores. WinFS, by default, provides only one store, named "DefaultStore." WinFS stores are exposed as shell objects, akin to virtual folders, which dynamically generates a list of all items present in the store and presents them in a folder view. The shell object also allows for the searching of information in the datastore.

WinFS does not have to be a physical file system. Rather, it can provide rich data modeling capabilities on top of the NTFS file system. It can use NTFS to store its data in physical files. WinFS can also use a relational engine, which may be derived from Microsoft® SQL Server 2005, for example, in order to provide a data relations mechanism, since the relation system in WinFS is similar to the relation system used in relational databases. WinFS stores can be SQL Server database (.MDF) files with a FILESTREAM attribute set. These files can be stored in a secured folder named "System Volume Information" placed into the volume root, and in folders under the folder "WinFS" with names of GUIDs of these stores.

WinFS also can allow programmatic access to its features, for example, via a set of Microsoft® NET (.NET) application programming interfaces (APIs), that enables applications to define custom made data types, define relationships among data, store and retrieve information, allow advanced searches, and so on. The applications can then use novel ways of aggregating data and presenting the aggregated data to the user.

Data Storage

A data unit that is stored in a WinFS store is called a WinFS item. A WinFS item also contains information on how the data item is related with other data. A WinFS Item can further consist of sub-entities called Fragments. WinFS allows Items and Fragments to be related together in different ways. The different types of relationships are:

Containment: Containment is an owning relationship. In an owning relationship there is a parent entity and an child entity Item References: ItemReference is a Fragment type that defines a relationship that contains data between two item instances based on the items keys (ItemId). The ItemReference is directed—one item is the source of the ItemReference and the other item is the target.

Condition based association: Condition based association enable declaration of relationships between items that are based on a value of a condition. The condition is an expression that uses values of the properties of the related items types WinFS helps in unification of data and thus it reduces redundancies. If different applications store data in a non interoperable way, data has to be duplicated across applications which deal with same data. For example, if more than one e-mail application is used, the list of contacts must be duplicated across the two. So, when there is any need for updating contact information, it must be done at two places. If, by mistake, it is not updated in one of the applications, it will continue to have outdated information. But with WinFS, an application can store all the contact information in a WinFS store, and supply the schema in which it is stored.

Then, other applications can use the stored data. By doing so, duplicate data is removed, and with it the hassles of manually maintaining siloed data.

Data Model

WinFS models data using the data items, along with its relationships, fragments and rules governing its usage. WinFS needs to understand the type and structure of the data items, so that the information stored in the data item can be made available to any application that requests it. This is done by the use of schemas. For every type of data item that is to be stored in WinFS, a corresponding schema needs to be provided which will define the type, structure and associations of the data. These schemas are defined, for example, using Extensible Markup Language (XML). XML allows designers to create their own customized tags, enabling the definition, transmission, validation, and interpretation of data between applications and between organizations.

Predefined WinFS schemas include schemas for messages, contacts, calendars, file items, etc., and also includes system schemas that include configuration, programs, and other system-related data. Custom schemas can be defined on a per-application basis, in situations where an application wants to store its data in WinFS, but not share the structure of that data with other applications. Or, they can be made available across the system.

System Types

One key difference between WinFS and other file systems is that WinFS knows the type of each data item that it stores (where the type specifies the properties of the data item). The WinFS type system can be closely associated with the NET Framework's concept of classes and inheritance. A new type can be created by extending and nesting any predefined types.

For example, FIG. 1 shows a block diagram illustrating an exemplary type hierarchy. Shown is item 100 that has three other item types deriving from it: contact 102, document 104, and picture 307. Item 100 can be a type that serves as a base class for other items, namely, contact 102 type, which may contain various contact information (name, address, etc.); document 104 type that may contain various documentation information; and, picture 106 type which may have various digital images. The three aforementioned types 102, 104, and 106 may have a specified relationship 108, 110, 112 to the item type 100 (for instance, some inheritance relationship).

In particular, WinFS provides four predefined base types: Items, Relationships, ScalarTypes, and ComplexTypes (sometimes referred to as "NestedTypes"). An Item is the fundamental data object, which can be stored, and a Relationship is the relation or link between two data items. Generally, since all WinFS items should have a type, the type of item stored defines its properties. The properties of an Item may be a ScalarType, which defines the smallest unit of information a property can have, or a ComplexType, which is a collection of more than one ScalarTypes and/or ComplexTypes. All WinFS types are made available as NET Common Language Runtime (CLR) classes. CLR is the core runtime engine in the Microsoft® .NET Framework for executing applications.

Any object represented as a data unit, such as contact, picture, document, etc, can be stored in a WinFS store as a specialization of the Item type. By default, WinFS provides Item types for Files, Contacts, Documents, Pictures, Audio, Video, Calendar, and Messages. The File Item can store any generic data, which is stored in file systems as files. The file item may not be specialized/derived from, but a WinFS schema can be provided to extend it using fragments that are added on to particular instances of File items. A file Item can also support being related to other Items. A developer can extend any of the WinFS types (other than File item), or the base type Item, to provide a type for his or her custom data.

Figure 2:
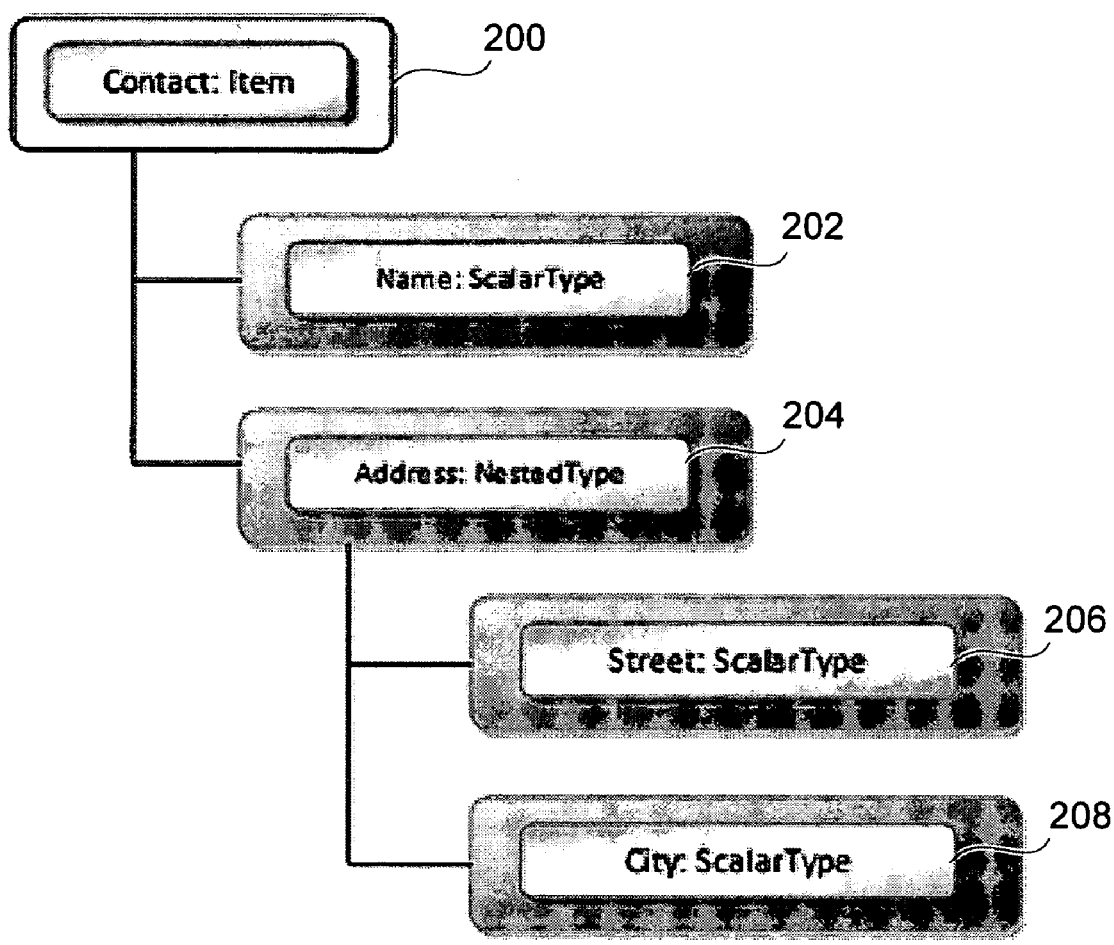
FIG. 2 illustrates a block diagram illustrating an example use of predefined types in defining a new type.

Referring next to FIG. 2, shown is a block diagram illustrating an example use of the predefined types in defining a new type. The data contained in an Item is defined in terms of properties, or fields which hold the actual data. For example, an Item Contact 200 may have a field Name 202 which is a ScalarType, and one field Address 204, a ComplexType (or "NestedType"), which is further composed of two Scalar-Types: Street 206 and City 208. To define this type, the base class Item is extended and the necessary fields are added to the class. A ComplexType field can be defined as another class which contains the two ScalarType fields. Once the type is defined, a schema is defined, which denotes the primitive type of each field. For example, the Name field 202 can be a string, the Address field 204 is a custom defined Address class. And, both of the ScalarTypes 206, 208 can be strings. Furthermore, other primitive types that WinFS supports are Integer, Byte, Decimal, Float, Double, Boolean and DateTime, and so on. The schema will also define which fields are mandatory and which are optional. The Contact Item 401 defined in this way will be used to store information regarding the Contact, by populating the properties field and storing it. If more properties on the item need to be added, such as "last conversed date," this type can be simply extended to accommodate them. Item types for other data can be defined similarly.

Figure 3:
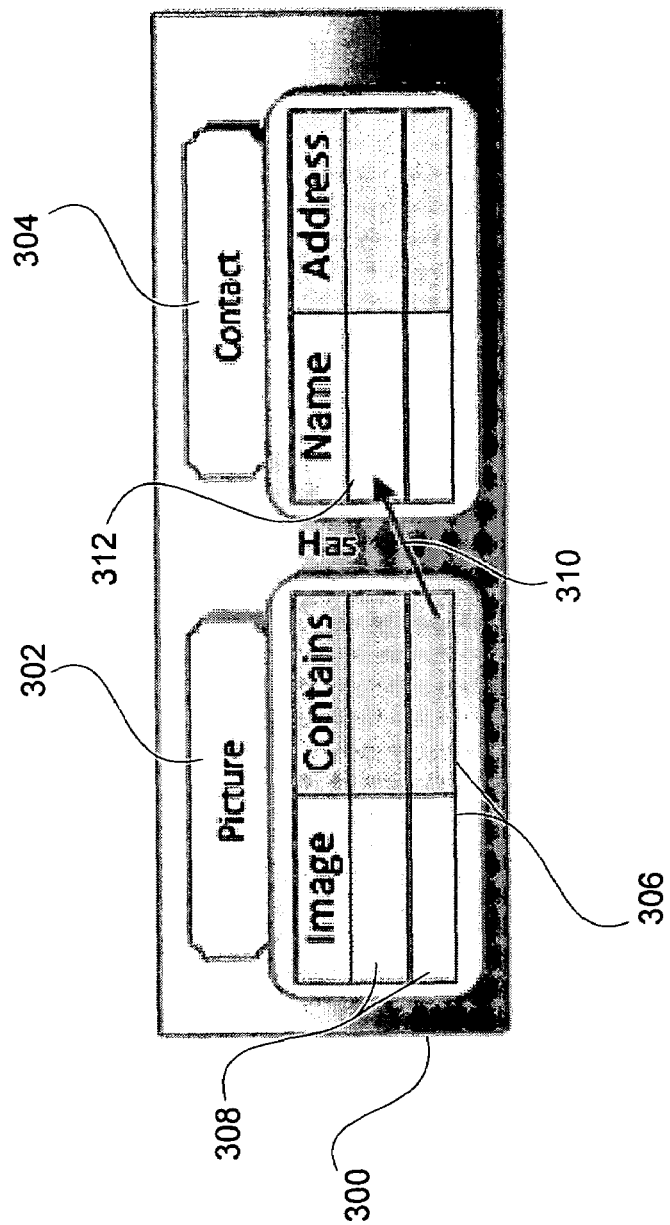
FIG. 3 illustrates a block diagram illustrating an exemplary relation stored as a reference to a particular row in the table of an item.

Referring next to FIG. 3, shown is a block diagram illustrating an exemplary relation stored as a reference to a particular row in the table of an item. WinFS creates a table 300 for all defined Items 302, 304. All the fields defined for the Picture Item 302 form the columns 306 of the table 300; and all instances of the Picture Item 302 are stored as rows 308 in the table 300 for the respective Item 302. A Relation 310 is stored as a reference to the particular row 312 in the table of the Contact Item 304, which holds the instance of the target Item 304 with which the current Item 302 is related. All Items 302, 304 can be exposed as NET CLR objects, with uniform interface providing access to the data stored in the fields. Thus, any application can retrieve object of any Item type and can use the data in the object, without worrying about the physical structure the data was stored in.

Synchronization of Entity Stores

As a matter of nomenclature, so far, the present disclosure has referred to "items" in item stores. However, more broadly speaking, entities can be either items or fragments, where items can exist independently and fragments typically exist within a context of an item. Those of skill in the art will readily appreciate that entities are schematized types (i.e. object types), of which items are independent types. In the present disclosure, at times, "items" and "entities" are used interchangeably, depending on the context. Moreover, those of skill in the art will also readily appreciate that different stores may contain different types of entities (either within such stores or across stores, where one entity store has entities of a first type and another store has entities of a second type).

Figure 4:
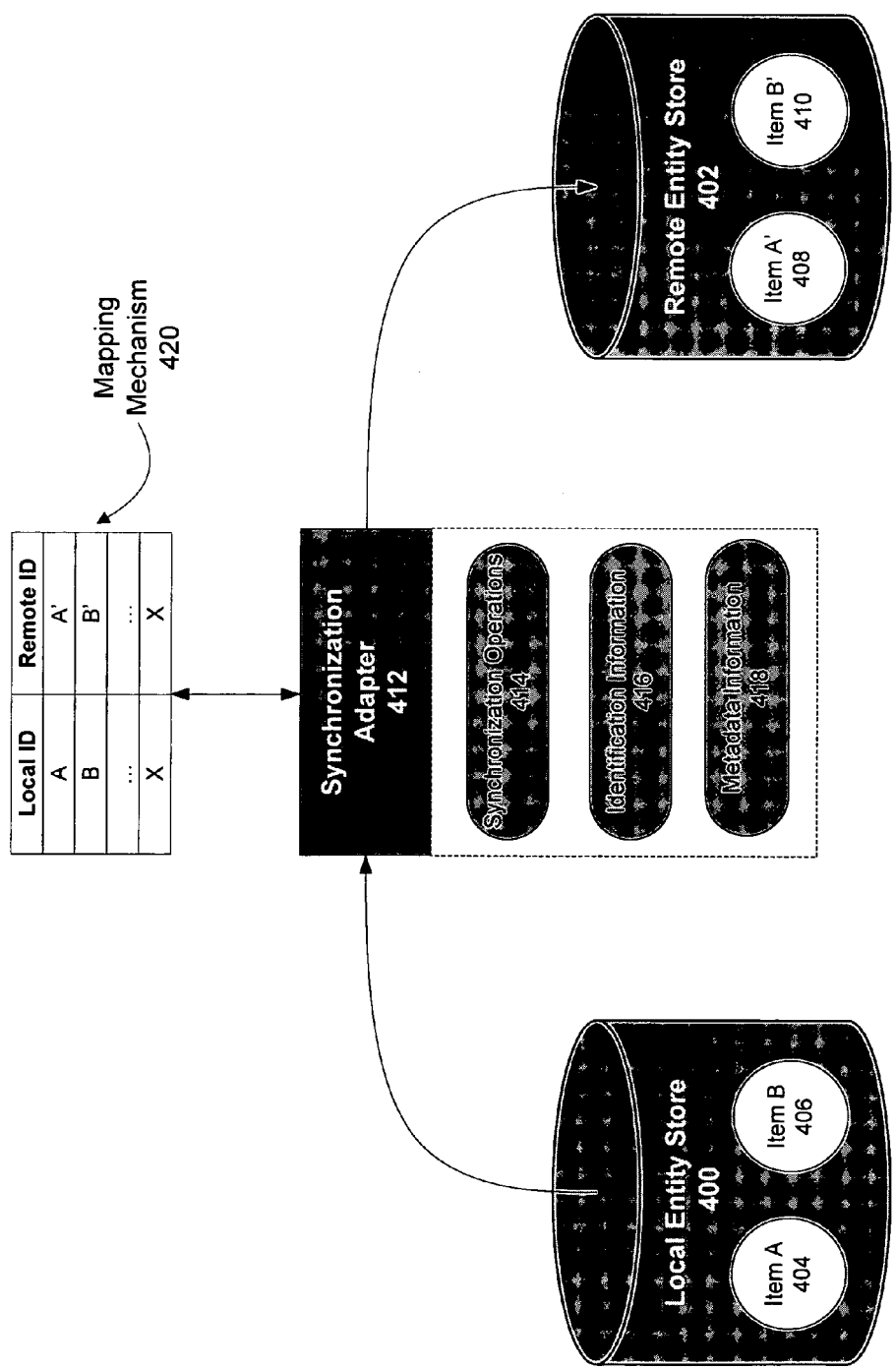
FIG. 4 illustrates a synchronization mechanism which includes identification information for entities in various stores.

FIG. 4, illustrates a basic synchronization scenario including an aspect of the presently disclosed subject matter. A synchronization adapter 412 (i.e. a "module") synchronizes a local entity store 400 and a remote entity store 402. Each of these stores may have some entities (items and fragments). For example, the local store 400 has an item A 404 and an item B 406, and these items may be tagged with identification marks (for example, GUIDs or other identifiers). Such identification of items across stores can be maintained in an identification map (such as a table), however such identification is not limited to a table. For example, a generic mapping mechanism 420 is shown, where a local store 400 identification for Item A 404 is "A" and the corresponding remote store 402 identification for Item A' 408 is "A'". Similarly, Item B 406 is related to Item B' 410 because of the B to B' identification correspondence in the mapping mechanism 420.

When the synchronization adapter 412 synchronizes the two stores 400, 402, it performs some synchronization operation 414. Along with this operation 414, the synchronization adapter 412 can also provide any identification information 416 (such as the information maintained by the mapping mechanism 420). Synchronizing data and identification information at the same time allows for dynamic maintenance of identity relationships. Similarly, providing identification information pursuant to synchronizing data, such as with an acknowledgement operation, can also aid in mapping identification information. Such simultaneous operation and identifier handling ensures data consistency. And moreover, to further ensure such consistency, any synchronization application programming interfaces (APIs) may be integrated with any identifier mapping APIs.

Furthermore, metadata information 410 can be maintained alongside (or within) the mapping mechanism 420. Such metadata, which may be understood as secondary storage in relation to the identification storage of the mapping mechanism 420, may be useful for storage of data such as watermark data (e.g. when data was synchronized the last time or some other indicator of version), secondary remote identification information, and so on.

In one aspect of the presently disclosed subject matter, the synchronization operations 414, the identification information 416, and the metadata information 418, is part of the same synchronization operation. This is a very useful feature in numerous scenarios. For example, in a system that does not provide such atomicity of operations 414 and information 416, 418, if an operation is performed first, and then the system crashes, without having had the opportunity to update its mapping tables, then the state of its data will be inconsistent. Such systems that maintain separate synchronization operations from identification maintenance (or at least perform these two tasks at different times as two separate transactions), suffer from a host of such problems.

In contrast, because the presently disclosed subject matter transacts operations 414 along with information 416, 418 related to identity mapping, this problem is obviated and any data stored in the entity stores 400, 402 is kept consistent. Furthermore, this feature is especially useful if the presently disclosed subject matter is embodied as a programming platform, essentially maintaining mapping information (in the mapping mechanism 420) along with any synchronization operations (add data, deleted data, update data, etc.). In short, the presently disclosed subject matter performs in the same transaction a synchronization operation along with an entity identification operation and a metadata operation. In one aspect, if a synchronization operation is performed, the entity identification operations and/or metadata operation are performed automatically for a user or developer so that such an individual does not have to separately perform or address said latter operation. In another aspect, such automatic coupling of operations can be accomplished via an application programming interface (API) where if an individual (or another module, for that matter) selects a synchronization operation, the entity identification operation and/or metadata operations are done behind the scenes—so that the API in essence serves as an API for synchronization and for mapping maintenance and/or metadata maintenance.

Figure 5:
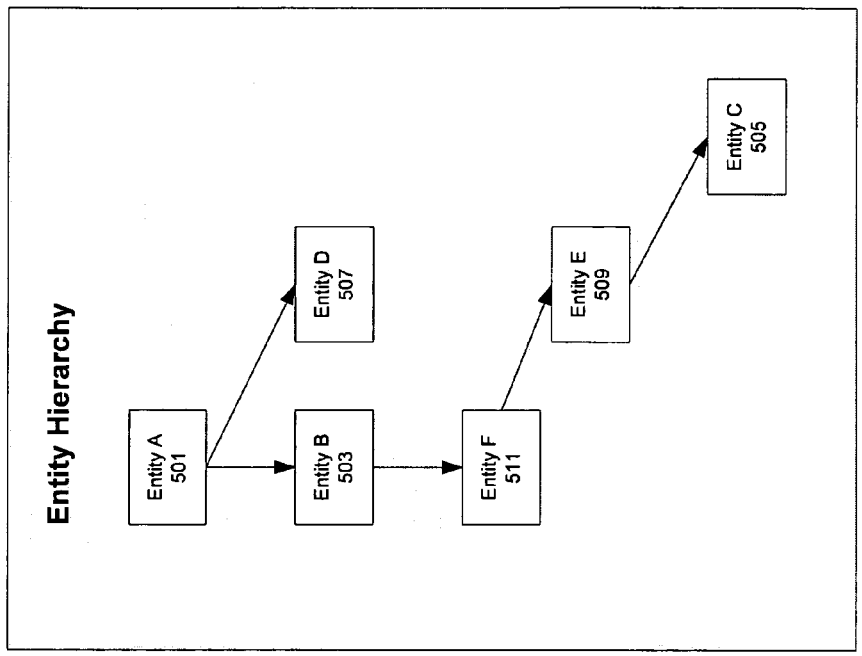
FIG. 5 illustrates the potential disparity between identification information hierarchy and entity hierarchy.
Figure 5:
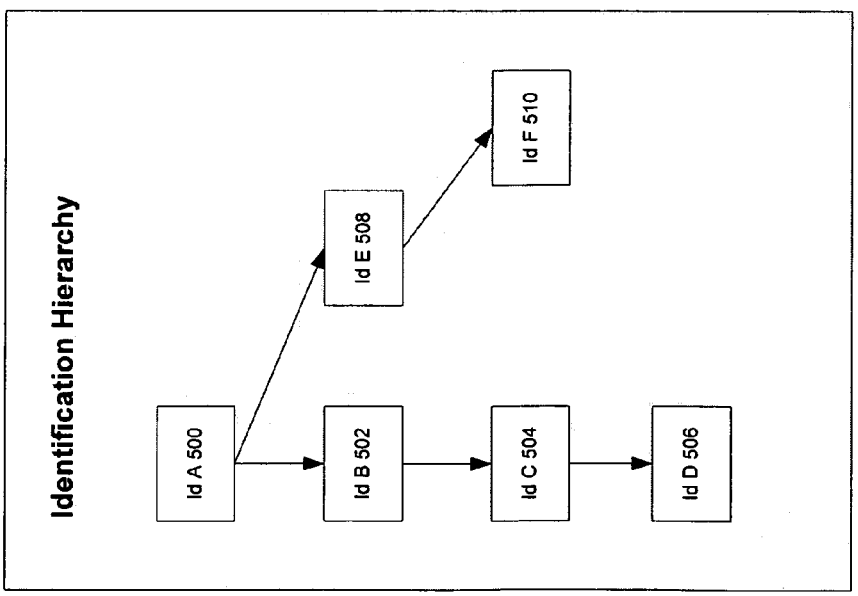

FIG. 5 illustrates the potential disparity between identification information hierarchy and entity hierarchy. In FIG. 5, a synchronization system employing aspect of the presently disclosed subject matter can handle such a disparity, which may be especially advantageous when the structure of the identification hierarchy is amenable to query requests. Thus, Id A 500 may be a root identifier and have children identifiers, namely Id B 502, Id C 504, Id D 506, Id E 508, and Id F 710. This structure may differ from the entity hierarchy, as can be seen: Entity A 501 has a child Entity B 503, but this entity 503 has a child entity F 511 (whereas, Id B 502 has a child identifier Id C 504.

Figure 6:
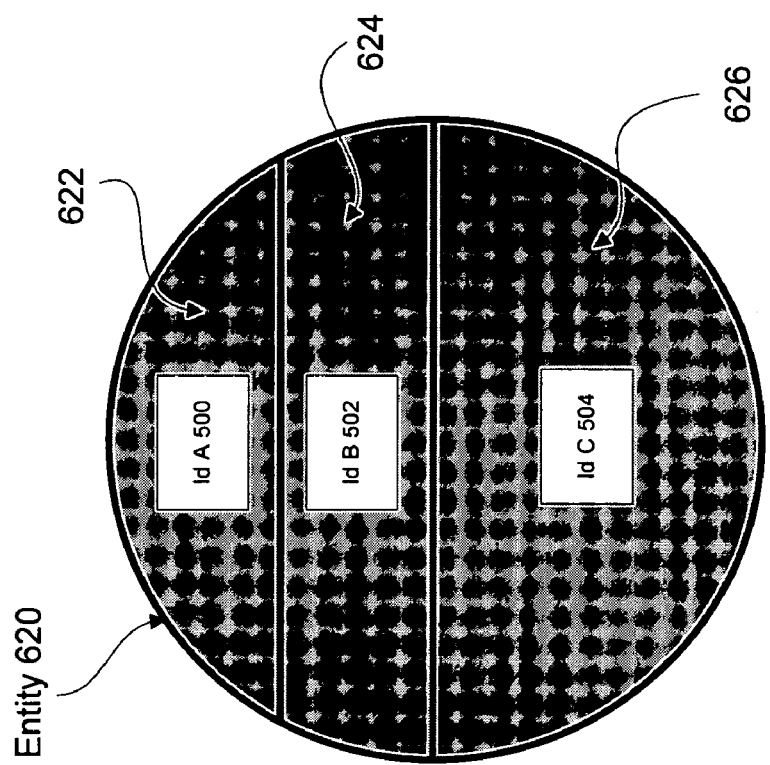
FIG. 6 illustrates that identifiers may be assigned to individual components of a given entity.

Next, FIG. 6, illustrates that identifiers may be assigned to individual components of a given entity. For example, given entity 620, the first component 622 may have assigned Id A 500; the second component 624 may have assigned Id B 502; and the third component 626 may have assigned Id C 504. Any given entity can have a plurality of components and hence a plurality of corresponding identifiers.

Figure 7:
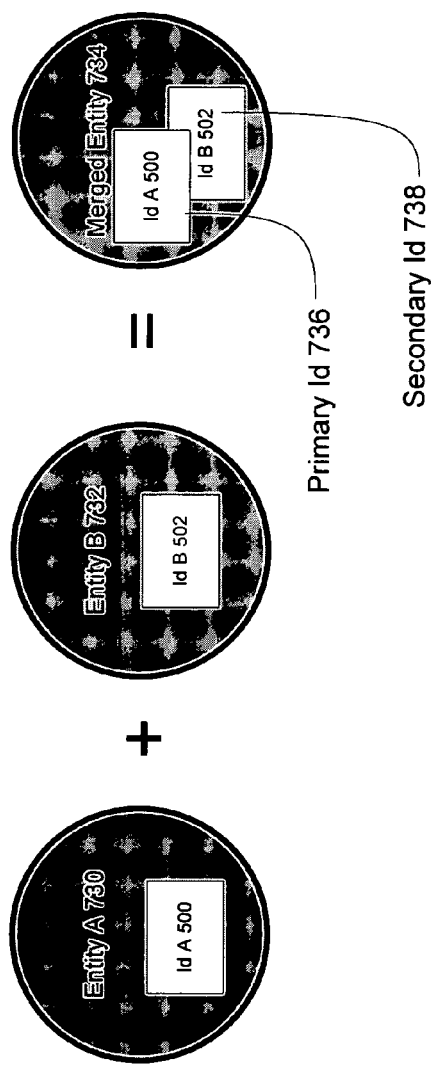
FIG. 7 illustrates that a merger of entities may result in assignment of primary and secondary identifiers.

FIG. 7, illustrates that a merger of entities may result in assignment of primary and secondary identifiers. Thus, entity A 730 has identifier Id A 500; and, entity B 732 has identifier Id B 502. One of two things can happen at this point—either [1] entity A 730 or [2] entity B 732 is the "winning" entity which is assigned the primary identifier (the "losing" entity can be assigned a secondary identifier). In FIG. 7, the merged entity 734 has Id A 500 as the primary Id 736 and Id B 502 as the secondary Id 738. This means that upon merger, entity A 730 was the winning entity (a fact that could be acknowledged by the synchronization adapter. Moreover, any identification mechanism discussed above can keep track of such a merger and assign the mentioned identifiers accordingly.

Figure 8:
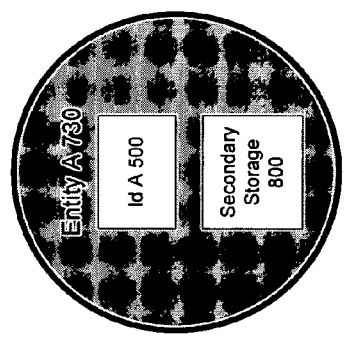
FIG. 8 illustrates the fact that a secondary (per entity) storage may be provided with each entity.
Figure 9:
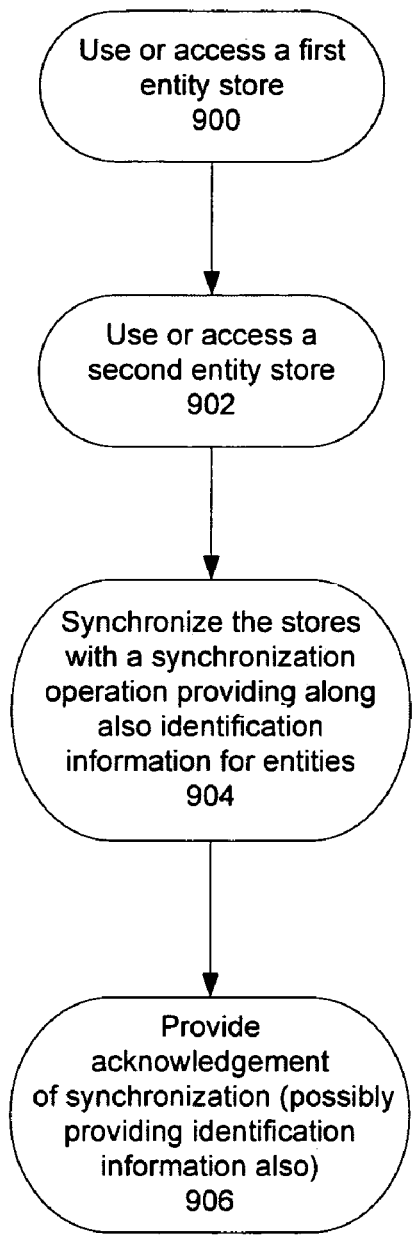
FIG. 9 illustrates in block diagram form aspects discussed with respect to the previous figures.

FIG. 8, illustrates the fact that a secondary (per entity) storage may be provided with each entity. Such storage may contain some metadata further supplementing identifying information relationships, as was discussed above. Such metadata could refer to watermark data, secondary identification data, etc. Thus, entity A 730, with an ID A 500, has secondary storage for metadata 800.

Those skilled in the art will readily appreciate the numerous scenarios that could unfold in the context of the presently disclosed subject matter, so there is no need to state them here. However, the following are some of the more interesting scenarios: scenario 1, an identification map can be automatically maintained for deletes applied during application of remote changes to a local store (such as WinFS), even if the previously supplied identification is not supplied for the current operation. Scenario 2: an identification map can be maintained for local store side deletes acknowledged as applied remotely. Scenario 3: an identification map can be automatically maintained on processing resurrections (see below for more) for update or delete constraint conflicts. These are only but three exemplary and non-limiting scenarios.

In summary, FIG. 8 illustrates in block diagram form the aspect of the presently disclosed subject matter. At block 800, pursuant to a synchronization operation, a use or access is made to a first entity store. Then, at block 802, the same use or access is made for a second entity store. Now, at block 804, these two stores can be synchronized with a synchronization operation providing along also identification and metadata information for entities. Once this is done, at block 806, acknowledgement of synchronization can be provided (possibly providing also identification information and metadata information).

Exemplary Implementation of an Identification Facility

Various code samples for a mapping facility can be constructed. The following is an exemplary coding of the aspects discussed above for a receive synchronization (this is the case where a synchronizing system is receiving and data is being sent from the remote store):

```
[Optionally start a transaction]
StorageContext ctx = new StorageContext (...)
// Acquire a sync service
SyncService SyncService =
    (SyncService) ctx.GetService(typeof(SyncService));
SyncService.Initialize( replicaItemId, remotePartnerId );
// Get the remote knowledge
ReplicaKnowledge remoteKnowledge = Foo.RetrieveRemoteKnowledge( );
foreach (batch of changes)
{
    foreach (changed RemoteEntity in batch) // Iterate over the changes from the remote store
    {
        // Lookup the remote entity using the id mapping facility
        StorageKey sk = syncService.GetLocalKeyForRemoteId(remoteEntity.Id);
        Entity e;
        if (sk != null)
            e = ctx.GetObjectByKey(sk) as Entity;
        if (sk != null && e != null) // The item exists in the map and in WinFS
        {
            // Update the item with the remote data
            e.foo = remoteEntity.foo;
            e.bar = remoteEntity.bar;
            // Record the Id
            e.SyncHelper.SetRemoteId(remoteEntity.Id);
        }
        else
        {
            if (sk != null) // No local item, but in id map so update/delete conflict
            {
                // Adapter chooses whether to delete wins, or instead to do a create
            }
            else
            {
                // This is a new entity
                // Create the entity
                e = CreateFooFromRemoteRemoteEntity(remoteEntity.Data);
                // Populate the properties of the entity as appropriate
                // Record the new id mapping
                e.SyncHelper.SetRemoteId(remoteEntity.Id);
            }
        }
    }
    remoteKnowledge = syncService.SaveContextChanges(remoteKnowledge);
}
// Store the remote knowledge
Foo.StoreRemoteKnowledge(remoteKnowledge);
// Finish with the context
ctx.SaveChanges( );
ctx.Close( );
[If transaction was opened, it will be commited]
```

In contrast to the code shown above, the following is sample code for a send synchronization (this is the case where a synchronization system is sending and the remote store is receiving synchronizing operations (optionally, also with identification and metadata information):

```
StorageContext ctx = new StorageContext (...)
// Acquire a sync service
sSyncService syncService =
        (sSyncService) ctx.GetService(typeof(sSyncService));
sSyncService.Initialize( replicaItemId, remotePartnerId );
// Get the remote knowledge
ReplicaKnowledge remoteKnowledge = Foo.RetrieveRemoteKnowledge( );
// Acquire a ChangeReader
using ( ChangeReader reader = sSyncService.GetChangeReader( remoteKnowledge ) )
{
    // Enumerate and process changes
    foreach (CompoundItemChange cic in reader)
    {
        // Process the root item
        ItemChange ic = cic.RootItemChange;
        // Is this a create, a delete, or an update
        try
        {
```

-continued

```
            switch (ic.ChangeType)
            {
                case ChangeType.Create:
                    // Create a remote record
                    Foo.AddRemoteEntity(ic.Data);
                    // Record the mapping
                    ic.RemoteMetadata.RemoteId = MyRemoteId;
                case ChangeType.Update:
                    // Update the corresponding remote record
                    Foo.UpdateRemoteEntity(ic.RemoteMetadata.RemoteId,
ic.Data);
                case ChangeType.Delete:
                    Foo.DeleteRemoteEntity(ic.RemoteMetadata.RemoteId);
            }
            reader.AcknowledgeChange(ic, ChangeResult.Success);
        }
        catch(MyRemoteStoreException ex)
        {
            ...
            // Error happened applying to the remote store
            // For example purposes we assume the error is recoverable
            // report error to the ChangeReader and move on
            reader.AcknowledgeChange(ic, ChangeResult.Error);
        }
        // First, links
        // Analogous processing to item
        // Next, fragments
        // Analogous to links.
        ...
        // Next, extensions
        foreach(ItemExtensionChange iec in ic.ExtensionChanges)
        {
            // Processing the ItemExtensionChange is analogous to other *Change
// However, setting iec.RemoteId is optional as Extension lifetime isn't managed for
            // via id facility lookup. Instead lifetime is coincident with corresponding
Item lifetime.
            [iec.RemoteId = ...;]
            // Acknowledge the change
            reader.AcknowledgeChange(lc, ChangeResult.Success);
        }
        // Then process embedded items
        ...
    }
    Foo.StoreRemoteKnowledge(ChangeReader.GetUpdatedRemoteKnowledge( ));
    reader.Close( );
}
// Finish with the context
ctx.SaveChanges( );
ctx.Close( );
```

A mapping facility can be exposed on a synchronization service (SyncService) class. It can be available to all users of the synchronization functionality. In the sample code below, each identification mapping table is per (replicaId, remotePartnerID) pair:

```
Namespace System.Storage.Sync
{
    public class SyncService
    {
        // Class is otherwise unchanged - these are all additions
        // Keep all existing members
        public void    Initialize (Guid replicaId, Guid remotePartnerId );
        // Id mapping facility lookup methods
        public StorageKey        GetLocalKeyForRemoteId(string remoteId);
        public string            GetRemoteIdForLocalKey(StorageKey localKey);
        public RemoteMetadata    GetRemoteMetadataForLocalKey(StorageKey
localKey);
        public RemoteMetadata    GetRemoteMetadataForRemoteId(string remoteId);
        public RemoteMetadata    GetRemoteMetadataForRemoteId(string remoteId,
                                    out StorageKey localKey)
        public IEnumerable<KeyValuePair<StorageKey, RemoteMetadata>>
```

-continued

```
GetChildRemoteMetadataForParentRemoteId(string remoteId);
    public void
BatchSaveRemoteMetadataUpdates(IList<KeyValuePair<StorageKey, RemoteMetadata>>);
    // Adapter metadata storage
    public InlineType    LoadRemotePartnerData( );
        public void SaveRemotePartnerData(InlineType remotePartnerData);
    }
}
```

The identification mapping facility can be provided for use with synchronization. The result is that it frees adapter writers from having to maintain their own identification maps. Moreover, also provided is the ability to optionally store adapter specific per-entity metadata along with the mapping. Specifically, the storage of any InlineType can be provided. Adapter writers can either use an exisiting InlineType or define their own custom InlineType (via the usual system schema definition mechanisms) to store their custom metadata. The latter option is more complicated than the former, but offers greater flexibility.

The benefits of using the identification mapping service include: (1) Allowance of attaching a remote parent identification as well as a remote identification to an item—this allows one to model the remote hierarchy in the identification map; the ability to do lookups in the id map by this hierarchy is provided; (2) The identification mapping service is integrated with the synchronization APIs thus making it easier to access and update the id map; (3) The id mapping service handles map maintenance under some specific sync operations, specifically processing of deletes, merge conflict resolution, etc.

This is but an exemplary coding of some of the aspects discussed above. Those skilled in the art will readily appreciate how to code the remaining aspects discussed above.

Sample Identification Mapping Information

In order to keep track of items, identification mapping information can be stored in a table (or some other such mapping mechanism, per the discussion above). For example, for identification mapping maintenance during update or delete conflicts, the following table may be accessed by the mentioned synchronization adapter:

| ReplicaId | RemotePartnerId | LocalId | RemoteId |
|---|---|---|---|
| ReplicaId1 | RemotePartnerId1 | Lid1 | Rid1 |

The initial state is that a local store and a remote store have item with local Id Lid1 and remote id Rid1, respectively. For a resurrection case (where an item is "resurrected" or brought back into existence, after perhaps, having been deleted), when item in the remote store is updated, a local synchronization adapter detects that item in local store is not in the synchronization scope (either because it was removed from the scope or deleted from the system altogether), therefore it will resurrect that item. Resurrected item will have the same remote id Rid1 and different local Id=Lid2.

When an item is successfully resurrected (assuming conflict policy was "remote update wins"), existing identification mapping information along with remote metadata needs to be reassigned to the new Lid2 of the resurrected item:

| ReplicaId | RemotePartnerId | LocalId | RemoteId |
|---|---|---|---|
| ReplicaId1 | RemotePartnerId1 | Lid2 | Rid1 |

When an item is deleted (assuming conflict policy was "local delete wins"), existing identification mapping information needs to be deleted. This will happen when synchronization will be done from the local store to the remote store, and the synchronization will enumerate delete changes for the item. Upon acknowledgement of that change, the identification mapping information will be deleted from the store.

Another sample mapping involves identification maintenance during merge conflicts (briefly discussed in the context of entities in FIG. 7). For example, the initial state for the local store can be: F1→I1; and F2→I2. The remote store can have: F2→I2. The table mapping entries, then, would be:

| ReplicaId | RemotePartnerId | LocalId | RemoteId |
|---|---|---|---|
| ReplicaId1 | RemotePartnerId1 | Lid(F2) | Rid(F2) |
| ReplicaId1 | RemotePartnerId1 | Lid(I2) | Rid(I2) |

Now, another local store replica can cause F2 to be renamed to F1 and this change gets applied to the local store replica causing merge to happen. Thus, now the state in the local store would be: F1→I1 and I2; and F2 ceases to exist (it is said to be a "tombstone"). Such a "tombstone" may not have any data, but it may still contain metadata that may be useful in synchronization—especially if multiple stores are involved in synchronization.

Now changes can be enumerated from the local store and applied to the remote store. The following changes get enumerated:
1. Merge create for F1 with secondary remote metadata for F2 (merge loser).
2. Create for I1.
3. Create for I2.
4. Merge delete for F2.

In this case, identification mapping change enumeration code will check if secondary remote metadata (for the merge loser) on the merge winner change has the same remote identification as the merge winner remote metadata (possibly assigned by adapter to be the same as of merge loser to reuse the same remote store item e.g. like directory in a file system), and if yes, then secondary remote metadata gets transferred to the merge winner to prevent it from being deleted when delete change for the merge loser gets acknowledged.

Exemplary Computing and Networking Environment

Figure 10:
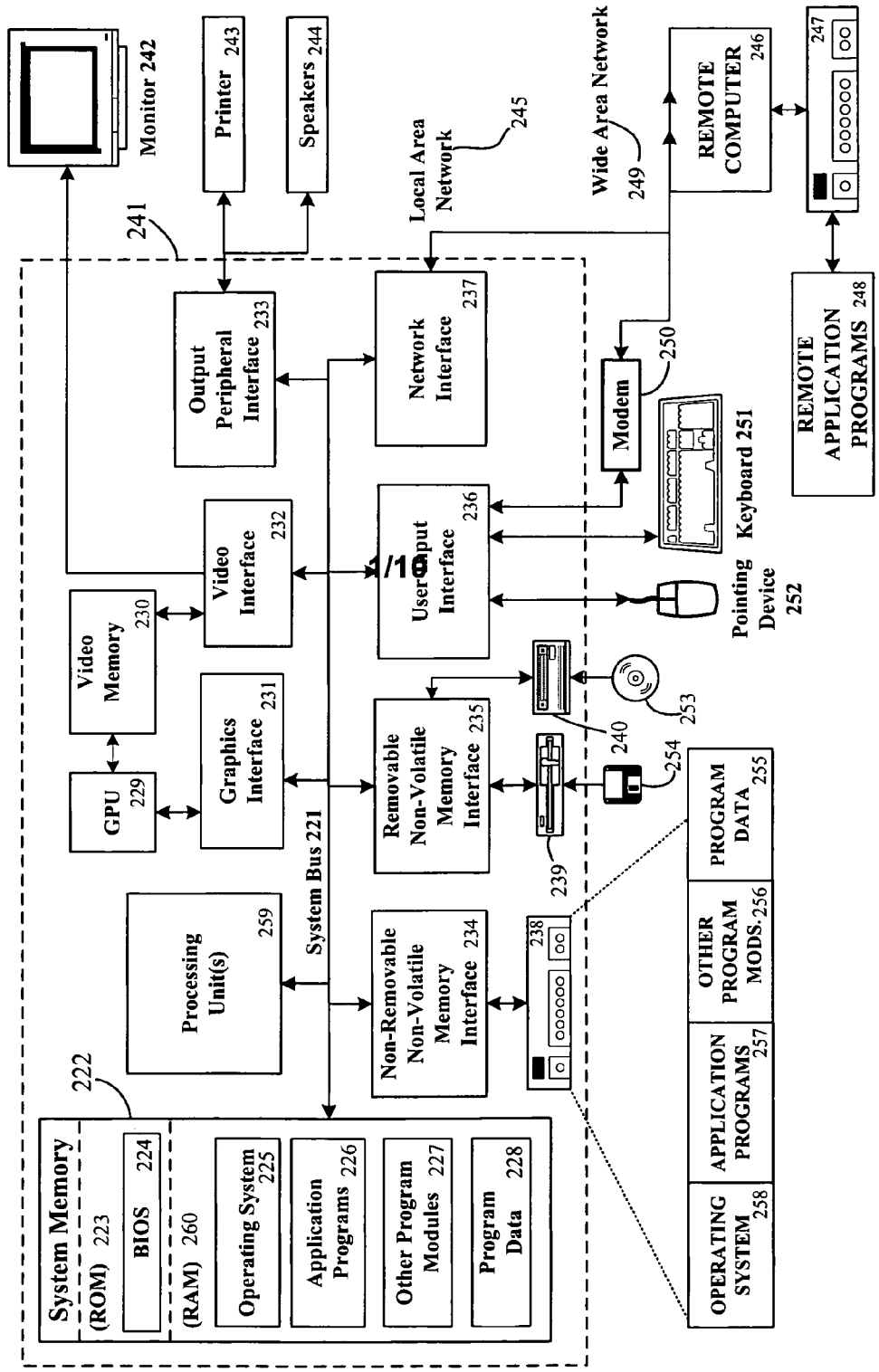
FIG. 10 illustrates a block diagram representing an exemplary computing device suitable for use in conjunction with a storage system employing identification mapping.

Referring to FIG. 10, shown is a block diagram representing an exemplary computing device suitable for use in conjunction with implementing the systems and methods described above. For example, the computer executable instructions that carry out the processes and methods for identification of entities with synchronization operations may reside and/or be executed in such a computing environment as shown in FIG. 10. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 10 illustrates operating system 225, application programs 226, other program modules 227, and program data 228.

The computer 241 may also include other removable/non-removable, volatile/nonvolatile computer storage media. By way of example only, FIG. 10 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 10, provide storage of computer readable instructions, data structures, program modules and other data for the computer 241. In FIG. 10, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 10. The logical connections depicted in FIG. 10 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 10 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 10, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 11:
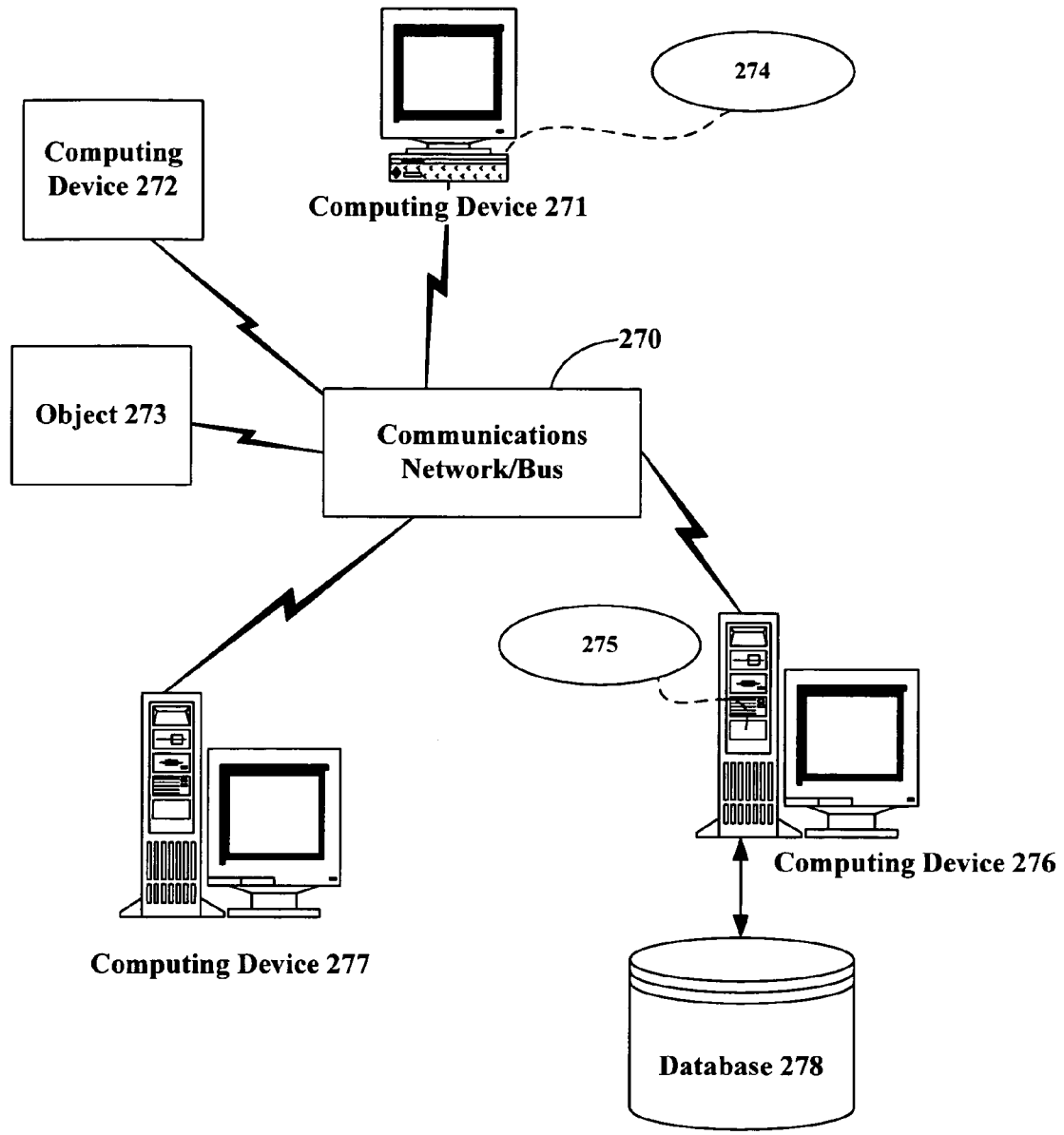
FIG. 11 illustrates an exemplary networked computing environment in which many computerized processes may be implemented to perform the aforementioned identification mapping in various devices across a network.

Referring next to FIG. 11, shown is an exemplary networked computing environment in which many computerized processes may be implemented to perform the processes described above. For example, parallel computing may be part of such a networked environment with various clients on the network of FIG. 11 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 11 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 11, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 11, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 11 and the further diversification that can occur in computing in a network environment such as that of FIG. 11, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, mechanisms for identification of entities with synchronization operations as disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for synchronizing entity stores, comprising:
a local entity store configured to maintain at least one local entity of a first type;
a remote entity store configured to maintain at least one remote entity of a second type different from the first type; and
a module for synchronizing entities, wherein said module synchronizes one of (a) said at least one local entity of said first type with said at least one remote entity of said second type and (b) said at least one remote entity of said second type with said at least one local entity of said first type, by performing an atomic transaction comprising a synchronization operation, an entity identity operation to automatically update entity identity relationships based on the synchronization operation, and a metadata operation to automatically update metadata stored in association with one or more entities based on the synchronization operation.

2. The system according to claim 1, wherein said module persists in a programming platform and is accessible via a synchronization application programming interface.

3. The system according to claim 1, wherein said synchronization operation merges a first entity, including one of said at least one local entity and at least one remote entity, with a second entity to generate a merged entity, and wherein said entity identity operation assigns an identity of the first entity or second entity as a primary identity of the merged entity.

4. The system according to claim 1, wherein said synchronization operation resurrects a previously deleted entity in one of said local entity store and remote entity store and wherein said identity operation one of (a) assigns a new identity to said previously deleted entity and (b) maintains an original identity for said previously deleted entity.

5. The system according to claim 1, wherein said synchronization operation deletes one of said at least one local entity and at least one remote entity, in response said metadata operation maintains metadata associated with said one of said at least one local entity and at least one remote entity, respectively.

6. The system according to claim 1, further comprising an application programming interface that is configured for synchronization using said module, wherein said interface provides for selecting said synchronization operation, wherein said entity identity operation performs maintenance of identity mapping of entities in said local entity store and said remote entity store pursuant to said selection of said synchronization operation.

7. The system according to claim 1, further comprising an additional entity store, wherein one of said local entity store and said remote entity store is synchronized with said additional entity store.

8. A method for synchronizing entity stores, comprising:
accessing a local entity store configured to maintain at least one local entity of a first type;
accessing a remote entity store configured to maintain at least one remote entity of a second type different from the first type; and
synchronizing one of (a) said at least one local entity of said first type with said at least one remote entity of said second type and (b) said at least one remote entity of said second type with said at least one local entity of said first type by performing an atomic transaction comprising a synchronization operation, an entity identity operation to automatically update entity identity relationships based on the synchronization operation, and a metadata operation.

9. The method according to claim 8, further comprising providing access to configure said synchronizing via a synchronization application programming interface associated with a programming platform.

10. The method according to claim 8, further comprising synchronizing by merging a first entity, including one of said at least one local entity and at least one remote entity, with a second entity to create a merged entity, in response said entity identity operation assigning an identity of the first entity or second entity as a primary identity of the merged entity.

11. The method according to claim 8, further comprising performing said synchronization operation that resurrects a previously deleted entity in one of said local entity store and remote entity store and performing said identity operation that one of (a) assigns a new identity to said previously deleted entity and (b) maintains an original identity for said previously deleted entity.

12. The method according to claim 8, further comprising synchronizing by deleting one of said at least one local entity and at least one remote entity, in response said metadata operation maintains metadata associated with said one of said at least one local entity and at least one remote entity, respectively.

13. The method according to claim 8, further comprising providing an application programming interface that is configured for synchronization using a synchronization module, wherein said interface provides for selecting said synchronization operation, wherein said entity identity operation performs maintenance of identity mapping of entities in said local entity store and said remote entity store pursuant to said selection of said synchronization operation.

14. The method according to claim 8, further comprising synchronizing an additional store with at least one of said local entity store and said remote store.

15. A computer readable storage medium comprising computer executable instructions tangibly embodied on the computer readable storage medium, wherein the computer executable instructions are executable by a computer to perform acts for synchronizing entity stores, wherein the acts comprise:
accessing a local entity store configured to maintain at least one local entity of a first type;
accessing a remote entity store configured to maintain at least one remote entity of a second type different from the first type; and
synchronizing one of (a) said at least one local entity of said first type with said at least one remote entity of said second type and (b) said at least one remote entity of said second type with said at least one local entity of said first type by performing an atomic transaction comprising a synchronization operation, an entity identify operation to automatically update entity identity relationships based on the synchronization operation, and a metadata operation.

16. The computer readable storage medium according to claim 15, further comprising computer executable instructions that are executable by a computer to perform an act of providing access to configure said synchronizing via a synchronization application programming interface associated with a programming platform.

17. The computer readable storage medium according to claim 15, further comprising computer executable instructions that are executable by a computer to perform acts of synchronizing by merging a first entity, including one of said at least one local entity and at least one remote entity, with a second entity to create a merged entity, in response said entity identity operation assigning an identity of the first entity or second entity as a primary identity of the merged entity.

18. The computer readable storage medium according to claim 15, further comprising computer executable instructions that are executable by a computer to perform acts of performing said synchronization operation that resurrects a previously deleted entity in one of said local entity store and remote entity store and performing said identity operation that one of (a) assigns a new identity to said previously deleted entity and (b) maintains an original identity for said previously deleted entity.

19. The computer readable storage medium according to claim 15, further comprising computer executable instructions that are executable by a computer to perform acts of synchronizing by deleting one of said at least one local entity and at least one remote entity, in response said metadata operation maintains metadata associated with said one of said at least one local entity and at least one remote entity, respectively.

20. The computer readable storage medium according to claim 15, further comprising computer executable instructions that are executable by a computer to perform acts of providing an application programming interface that is configured for synchronization using a synchronization module, wherein said interface provides for selecting said synchronization operation, wherein said entity identity operation performs maintenance of identity mapping of entities in said local entity store and said remote entity store pursuant to said selection of said synchronization operation.

* * * * *

UNITED STATES PATENT AND TRADEMARK OFFICE
CERTIFICATE OF CORRECTION

PATENT NO.        : 7,523,141 B2
APPLICATION NO.   : 11/497014
DATED             : April 21, 2009
INVENTOR(S)       : Andrei Makismenka et al.

It is certified that error appears in the above-identified patent and that said Letters Patent is hereby corrected as shown below:

In column 22, line 12, in Claim 15, delete "identify" and insert -- identity --, therefor.

Signed and Sealed this
Third Day of May, 2011

David J. Kappos
*Director of the United States Patent and Trademark Office*